(12) United States Patent
Sakuma et al.

(10) Patent No.: US 10,910,987 B2
(45) Date of Patent: Feb. 2, 2021

(54) MOTOR CONTROL METHOD

(71) Applicant: TOYOTA JIDOSHA KABUSHIKI KAISHA, Toyota (JP)

(72) Inventors: Noritsugu Sakuma, Mishima (JP); Masao Yano, Toyota (JP); Masaaki Ito, Sunto-gun (JP); Tetsuya Shoji, Susono (JP); Hidefumi Kishimoto, Susono (JP); Akira Kato, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/460,100

(22) Filed: Jul. 2, 2019

(65) Prior Publication Data

US 2020/0036322 A1    Jan. 30, 2020

(30) Foreign Application Priority Data

Jul. 24, 2018    (JP) ................................. 2018-138380

(51) Int. Cl.
*H02P 29/66* (2016.01)
*H01F 7/02* (2006.01)
*H02P 3/06* (2006.01)

(52) U.S. Cl.
CPC ............ *H02P 29/662* (2016.11); *H01F 7/021* (2013.01); *H02P 3/065* (2013.01)

(58) Field of Classification Search
CPC ......... H02P 29/662; H02P 3/065; H01F 7/021
See application file for complete search history.

(56) References Cited

U.S. PATENT DOCUMENTS

| 2009/0224624 A1* | 9/2009 | Kumar .................. H02K 1/276 |
| | | 310/156.53 |
| 2014/0152137 A1 | 6/2014 | Jang et al. |
| 2016/0141083 A1 | 5/2016 | Ito et al. |

FOREIGN PATENT DOCUMENTS

| JP | 2014-110760 A | 6/2014 |
| JP | 2016-103936 A | 6/2016 |
| JP | 6183457 B2 | 8/2017 |

\* cited by examiner

*Primary Examiner* — Cortez M Cook
(74) *Attorney, Agent, or Firm* — Oliff PLC

(57) ABSTRACT

To provide a motor control method ensuring that dragging loss at the time of high rotation can be reduced.
A motor control method, wherein a composite permanent magnet has a core part and a shell part, the Curie temperature of one of the core part and the shell part is $T_{c1}$ K, and the Curie temperature of another is $T_{c2}$ K, and wherein when the magnitude of the reluctance torque is equal to or greater than the magnitude of the magnet torque, the temperature of the composite permanent magnet is set at $T_s$ K that is ($T_{c1}-100$) K or higher and lower than $T_{c2}$ K and when the magnitude of the reluctance torque is less than the magnitude of the magnetic torque, the temperature of the composite permanent magnet is set at lower than the temperature $T_s$ K or $T_{c1}$ K, whichever is lower.

24 Claims, 5 Drawing Sheets

MOTOR CONTROL METHOD

TECHNICAL FIELD

The present disclosure relates to a motor control method. In particular, the present disclosure relates to a method for controlling a motor including a rotor having disposed thereon a permanent magnet and utilizing a magnet torque and a reluctance torque.

BACKGROUND ART

Conventionally, the motor performance has been evaluated by the efficiency during rated operation (operation in which the rotational speed and the torque are constant). However, the performance of a motor used in a moving body such as automobile can hardly be evaluated by the efficiency during rated operation. For example, a motor for driving an automobile, etc. is used with high torque at the time of low rotation (during starting) and used with low torque at the time of high rotation (during normal running). Accordingly, the motor for driving an automobile, etc. is required to have high efficiency over a wide rotation region from low rotation to high rotation.

A Permanent Magnet motor (PM motor) is used as a motor for driving an automobile, etc. The permanent magnet motor is a motor including a rotor having disposed thereon a permanent magnet and is also referred to as a magnet synchronous motor.

When a permanent magnet having a high magnetic flux is used as a permanent magnet disposed on a rotor of a permanent magnet motor, a high torque can be obtained. In the motor for driving an automobile, etc., a permanent magnet having a high magnetic flux is applied as the permanent magnet disposed on a rotor, because a high torque is required during starting. On the other hand, the torque required during normal running is not so high as that required during starting. In addition, during normal running, the motor is operating at high rotation, compared with during starting.

In the permanent magnet motor, as the rotational speed increases, the counter electromotive voltage rises. In addition, the larger the magnetic flux of the permanent magnet disposed on a rotor, the higher the counter electromotive voltage. Furthermore, the counter electromotive voltage causes dragging loss. Accordingly, in the case where a permanent magnet motor including a rotor having disposed thereon a permanent magnet with high magnetic flux is used as an automobile driving motor, although high torque is obtained during starting, the dragging loss increases during normal running (at the time of high rotation).

In order to reduce the dragging loss, a variable magnetic flux motor in which the magnetic flux of a permanent magnet disposed on a rotor is reduced at the time of high rotation has been proposed. For example, Patent Document 1 discloses an outer rotor-type variable magnetic flux motor in which an outer rotor disposed radially outside a stator is slid in an axial direction of the motor to reduce the magnetic flux of a permanent magnet disposed on the outer rotor.

RELATED ART

Patent Document

[Patent Document 1] Japanese Unexamined Patent Publication No. 2016-103936

SUMMARY OF THE INVENTION

Technical Problem

In the motor disclosed in Patent Document 1, a magnetic flux in the reverse direction to the magnetic flux of the permanent magnet disposed on the outer rotor (hereinafter, sometimes simply referred to as "reverse magnetic flux") is generated by a stator coil at the time of high rotation to reduce the magnetic flux of the permanent magnet. Consequently, the dragging loss is reduced by suppressing an increase in the counter electromotive voltage at the time of high rotation.

The present inventors have found a problem that since the counter electromotive voltage at the time of high rotation is a high voltage, in order for a stator coil to generate a magnetic flux sufficient to cancel out the counter electromotive voltage, the load for an inverter connected to the stator coil is large.

The present disclosure has been made to solve the above-described problem. An object of the present disclosure is to provide a motor control method ensuring that in a variable magnetic flux motor, dragging loss at the time of high rotation can be reduced without generating a magnetic flux in the reverse direction to the magnetic flux of a permanent magnet disposed on a rotor.

Solution to Problem

The present inventors have made many intensive studies to attain the object above and have accomplished the motor control method of the present disclosure. The motor control method of the present disclosure includes the following embodiments.

<1> A method for controlling a motor including a rotor having disposed thereon a permanent magnet and utilizing a magnet torque and a reluctance torque, wherein the permanent magnet is a composite permanent magnet having a magnetic phase and a grain boundary phase present around the magnetic phase, the magnetic phase has a core part and a shell part present around the core part, the Curie temperature of one of the core part and the shell part is $T_{c1}$ K, the Curie temperature of another is $T_{c2}$ K, and $T_{c2}$ K is higher than $T_{c1}$ K, and wherein when the magnitude of the reluctance torque is equal to or greater than the magnitude of the magnet torque, the temperature of the composite permanent magnet is set at $T_s$ K that is ($T_{c1}$−100) K or higher and lower than $T_{c2}$ K and when the magnitude of the reluctance torque is less than the magnitude of the magnet torque, the temperature of the composite permanent magnet is set at lower than the temperature $T_s$ K or $T_{c1}$ K, whichever is lower.

<2> The method according to item <1>, wherein the Curie temperature of the core part is $T_{c1}$ K and the Curie temperature of the shell part is $T_{c2}$ K.

<3> The method according to item <2>, wherein the composite permanent magnet has an overall composition of $(R^2_{(1-x)}R^1_x)_y Fe_{(100-y-w-z-v)} Co_w B_z M_v$ (wherein $R^2$ represents one or more selected from the group consisting of Nd and Pr, $R^1$ represents one or more selected from group consisting of Ce, La, Gd, Y and Sc, M represents one or more selected from the group consisting of Ga, Al, Cu, Au, Ag, Zn, In and Mn and an unavoidable impurity, 0<x<1, y=from 12 to 20, z=from 5.6 to 6.5, w=from 0 to 8, and v=from 0 to 2), and $R^1/(R^2+R^1)$ in the core part is larger than $R^1/(R^2+R^1)$ in the shell part.

<4> The method according to item <3>, wherein the average particle diameter of the magnetic phase is 1,000 nm or less.

<5> The method according to item <3> or <4>, wherein $R^1$ is one or more selected from the group consisting of Ce and La and $R^2$ is Nd.

<6> The method according to item <3> or <4>, wherein $R^1$ is Ce and $R^2$ is Nd.

<7> The method according to item <1>, wherein the Curie temperature of the core part is $T_{c2}$ K and the Curie temperature of the shell part is $T_{c1}$ K.

<8> The method according to item <7>, wherein the composite permanent magnet has an overall composition of $(R^2_{(1-x)}R^1_x)_y Fe_{(100-y-w-z-v)} Co_w B_z M_v$ (wherein $R^2$ represents one or more selected from the group consisting of Nd and Pr, $R^1$ represents one or more selected from group consisting of Ce, La, Gd, Y and Sc, M represents one or more selected from the group consisting of Ga, Al, Cu, Au, Ag, Zn, In and Mn and an unavoidable impurity, 0<x<1, y=from 12 to 20, z=from 5.6 to 6.5, w=from 0 to 8, and v=from 0 to 2), and $R^1/(R^2+R^1)$ in the core part is larger than $R^1/(R^2+R^1)$ in the shell part.

<9> The method according to item <8>, wherein the average particle diameter of the magnetic phase is 1,000 nm or less.

<10> The method according to item <8> or <9>, wherein $R^1$ is one or more selected from the group consisting of Ce and La and $R^2$ is Nd.

<11> The method according to item <8> or <9>, wherein $R^1$ is Ce and $R^2$ is Nd.

<12> The method according to any one of items <1> to <11>, wherein when the magnitude of the reluctance torque is equal to or greater than the magnitude of the magnet torque, a heat insulating material is disposed on the motor so as to set the temperature of the composite permanent magnet at $T_s$ K that is $(T_{c1}-100)$ K or higher and lower than $T_{c2}$ K and when the magnitude of the reluctance torque is less than the magnitude of the magnetic torque, the heat insulating material is removed from the motor so as to set the temperature of the composite permanent magnet at lower than the temperature $T_s$ K or $T_{c1}$ K, whichever is lower.

<13> The method according to any one of items <1> to <11>, wherein when the magnitude of the reluctance torque is equal to or greater than the magnitude of the magnet torque, a heat radiation member on the motor is removed so as to set the temperature of the composite permanent magnet at $T_s$ K that is $(T_{c1}-100)$ K or higher and lower than $T_{c2}$ K and when the magnitude of the reluctance torque is less than the magnitude of the magnetic torque, the heat radiation member is again disposed on the motor so as to set the temperature of the composite permanent magnet at lower than the temperature $T_s$ K or $T_{c1}$ K, whichever is lower.

<14> The method according to any one of items <1> to <11>, wherein the motor is disposed in an electric-powered vehicle, when the magnitude of the reluctance torque is equal to or greater than the magnitude of the magnet torque, the flow rate of a cooling fluid supplied to the motor is decreased so as to set the temperature of the composite permanent magnet at $T_s$ K that is $(T_{c1}-100)$ K or higher and lower than $T_{c2}$ K and when the magnitude of the reluctance torque is less than the magnitude of the magnetic torque, the flow rate of the cooling fluid is increased so as to set the temperature of the composite permanent magnet at lower than the temperature $T_s$ K or $T_{c1}$ K, whichever is lower.

<15> The method according to item <14>, wherein the electric-powered vehicle is a hybrid vehicle having an engine and the motor, and the cooling fluid is a lubricating fluid filled inside a power dividing mechanism connecting the engine and the motor.

<16> The method according to any one of items <1> to <15>, wherein when the magnitude of the reluctance torque is equal to or greater than the magnitude of the magnet torque, the temperature of the composite permanent magnet is set at $T_s$ K that is $(T_{c1}-50)$ K or higher and lower than $T_{c2}$ K.

<17> The method according to any one of items <1> to <15>, wherein when the magnitude of the reluctance torque is equal to or greater than the magnitude of the magnet torque, the temperature of the composite permanent magnet is set at $T_s$ K that is $T_{c1}$ K or higher and lower than $T_{c2}$ K.

<18> The method according to any one of items <1> to <15>, wherein when the magnitude of the reluctance torque is equal to or greater than the magnitude of the magnet torque, the temperature of the composite permanent magnet is set at $T_s$ K that is $(T_{c1}-100)$ K or higher and $(T_{c2}-5)$ K or lower.

<19> The method according to any one of items <1> to <15>, wherein when the magnitude of the reluctance torque is equal to or greater than the magnitude of the magnet torque, the temperature of the composite permanent magnet is set at $T_s$ K that is $(T_{c1}-50)$ K or higher and $(T_{c2}-5)$ K or lower.

<20> The method according to any one of items <1> to <15>, wherein when the magnitude of the reluctance torque is equal to or greater than the magnitude of the magnet torque, the temperature of the composite permanent magnet is set at $T_s$ K that is $T_{c1}$ K or higher and $(T_{c2}-5)$ K or lower.

<21> The method according to any one of items <1> to <15>, wherein when the magnitude of the reluctance torque is equal to or greater than the magnitude of the magnet torque, the temperature of the composite permanent magnet is set at $T_s$ K that is $(T_{c1}-100)$ K or higher and $(T_{c1}+50)$ K or lower.

<22> The method according to any one of items <1> to <15>, wherein when the magnitude of the reluctance torque is equal to or greater than the magnitude of the magnet torque, the temperature of the composite permanent magnet is set at $T_s$ K that is $(T_{c1}-50)$ K or higher and $(T_{c1}+50)$ K or lower.

<23> The method according to any one of items <1> to <15>, wherein when the magnitude of the reluctance torque is equal to or greater than the magnitude of the magnet torque, the temperature of the composite permanent magnet is set at $T_s$ K that is $T_{c1}$ K or higher and $(T_{c1}+50)$ K or lower.

<24> The method according to any one of items <1> to <23>, wherein the temperature of the composite permanent magnet is detected by a temperature sensor disposed inside or outside the motor.

Effects of the Invention

According to the present disclosure, a composite permanent magnet having at least two different Curie temperatures is applied to the rotor of a permanent magnet motor, and the temperature of the composite permanent magnet is controlled according to the rotational speed of the motor, enabling to achieve self-demagnetization and self-remagnetization of the composite permanent magnet. As a result, according to the present disclosure, a motor control method capable of reducing dragging loss at the time of high rotation without generating a magnetic flux in the reverse direction to the magnetic flux of a permanent magnet disposed on a rotor can be provided.

MODE FOR CARRYING OUT THE INVENTION

Figure 1:
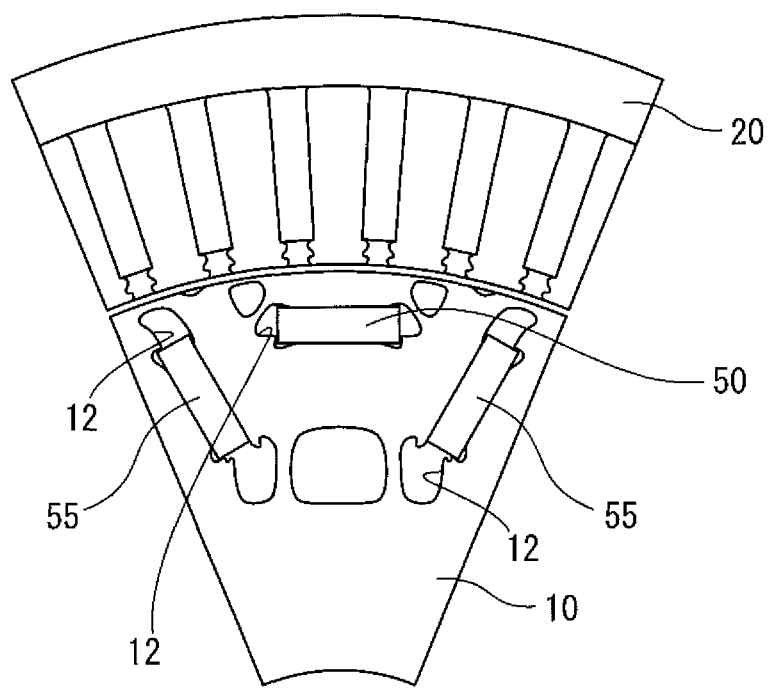
FIG. 1 is a schematic diagram illustrating an example where a composite permanent magnet is disposed on a rotor of an embedded magnet-type motor.

The embodiments of the motor control method according to the present disclosure are described in detail below. However, the embodiments described below should not be construed to limit the motor control method according to the present disclosure.

The permanent magnet motor (PM motor: Permanent Magnet motor) is a motor including a rotor having disposed thereon a permanent magnet and utilizing a magnet torque and a reluctance torque. The magnet torque is a torque due to an interaction between the magnetic flux from the permanent magnet disposed on the rotor and the magnetic flux from a stator coil. The reluctance torque is a torque due to an interaction between an iron core portion on the surface of the rotor and the magnetic flux from the stator coil.

In the permanent magnet motor, a high torque is obtained at the time of low rotation but as the rotational speed increases, the back electromotive force rises, leading to an increase in dragging loss. In addition, in the permanent magnet motor, the magnet torque is larger than the reluctance torque at the time of low rotation and as the rotational speed increases, the reluctance torque rises.

In the case of using the permanent magnet motor as an automobile driving motor, the reluctance torque becomes larger than the magnet torque during normal running and expressway running. At the time of such high rotation (hereinafter, sometimes simply referred to as "at the time of high rotation"), in the permanent magnet motor, a large dragging loss is produced due to a rise in the back electromotive force.

In order to reduce the magnetic flux (demagnetization) of a permanent magnet at the time of high rotation, conventionally, a magnetic flux in the reverse direction to the magnetic flux of the permanent magnet has been caused to act from the outside of the permanent magnet. In addition, in order to remagnetize the once-demagnetized permanent magnet when the motor operating state returns to low rotation from high rotation, a magnetic flux in the same direction as the permanent magnet has been caused to act from the outside of the permanent magnet.

The present inventors have found that instead of the operations above, when a composite permanent magnet having at least two different Curie temperatures is disposed on a rotor and the temperature of the composite permanent magnet is controlled according to the rotational speed of the motor, self-demagnetization and self-remagnetization of the composite permanent magnet can be achieved. Furthermore, the present inventors have found that such a composite permanent magnet is not obtained by joining permanent magnets differing in the Curie temperature but is obtained by forming, in one permanent magnet, an alloy structure (magnetic phase structure) having different Curie temperatures.

Constituent features of the motor control method according to the present disclosure, which is based on those findings, are described below.

<<Motor Control Method>>

The motor controlled by the motor control method of the present disclosure (hereinafter, sometimes referred to as "the method of the present disclosure") is a motor including a rotor having disposed thereon a permanent magnet and utilizing a magnet torque and a reluctance torque, and the permanent magnet may be the later-described composite permanent magnet. In general, such a motor is called a permanent magnet motor (PM motor: Permanent Magnet motor).

The permanent magnet motor includes a surface magnet-type motor and an embedded magnet-type motor, etc. The surface magnet-type motor is a motor fabricated by incorporating a permanent magnet into the surface of a rotor and is sometimes called SPM (Surface Permanent Motor). The embedded magnet-type motor is a motor fabricated by incorporating a permanent magnet inside an iron core of the rotor and is sometimes called IPM (Interior Permanent Magnet).

As the permanent magnet disposed on the rotor, a composite permanent magnet having at least two different Curie temperatures $T_{c1}$ K and $T_{c2}$ K, with $T_{c2}$ K being higher than $T_{c1}$ K, is applied.

The position for disposing the composite permanent magnet on the rotor may be the same as that in the conventional permanent magnet motor. FIG. 1 is a schematic diagram illustrating an example where a composite permanent magnet is disposed on a rotor of an embedded magnet-type motor. In the example illustrated in FIG. 1, a stator 20 is disposed outside the rotor 10, and a composite permanent magnet 50 and a normal permanent magnet 55 are disposed in holes 12 provided on the rotor 10. The normal permanent magnet means a permanent magnet having one Curie temperature. The normal permanent magnet includes, for example, a ferrite magnet and a rare earth magnet.

In the example illustrated in FIG. 1, one composite permanent magnet 50 is disposed at a position close to the stator 20, and two normal permanent magnets 55 are disposed at positions distant from the stator 20, but the configuration is not limited thereto. The composite permanent magnet 50 and the normal permanent magnet 55 may be reversed in position. More specifically, one normal permanent magnet 55 may be disposed at a position close to the stator 20, and two composite permanent magnets 50 may be disposed at positions distant from the stator 20. In the method of the present disclosure, the permanent magnet is not demagnetized by causing a stator coil to generate a magnetic flux in the reverse direction to the permanent magnet. Accordingly, the position for disposing a permanent magnet to be demagnetized may be distant from the stator 20.

In the method of the present disclosure, self-demagnetization and self-remagnetization of the permanent magnet are achieved by controlling the temperature of the permanent magnet disposed on the rotor 10. For this reason, at least one composite permanent magnet 50 is disposed as the permanent magnet on the rotor 10.

The composite permanent magnet 50 has at least two different Curie temperatures $T_{c1}$ K and $T_{c2}$ K, and $T_{c2}$ K is higher than $T_{c1}$ K. The temperature of such a composite permanent magnet 50 is controlled, and the composite permanent magnet 50 can thereby be caused to undergo self-demagnetization and self-remagnetization.

Figure 2:
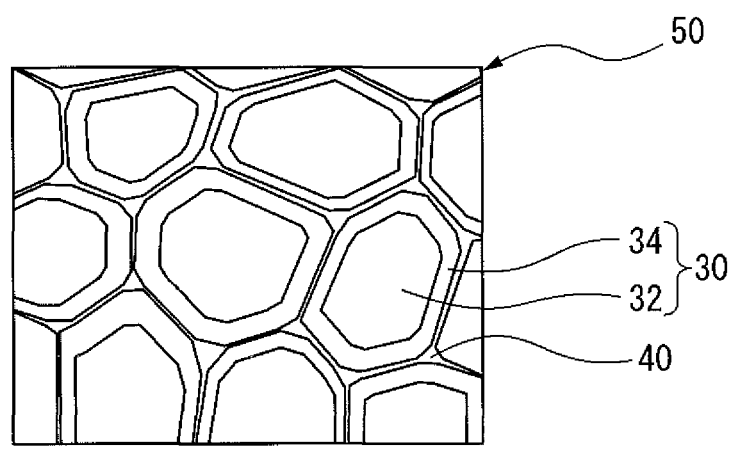
FIG. 2 is a schematic diagram illustrating an outline of an alloy structure of a composite permanent magnet.

FIG. 2 is a schematic diagram illustrating a part of an alloy structure of a composite permanent magnet 50. The composite permanent magnet 50 has, as the alloy structure, a magnetic phase 30 and a grain boundary phase 40. The grain boundary phase 40 is present around the magnetic phase 30. The magnetic phase 30 has a core part 32 and a shell part 34. The shell part 34 is present around the core part 32.

The magnetic force of the composite permanent magnet 50 is mainly attributable to the magnetic phase 30. The "mainly" means that a magnetized phase can be present, even if only slightly, also in the grain boundary phase 40.

The magnetic phase 30 of the composite permanent magnet 50 has a core part 32 and a shell part 34, and this allows the composite permanent magnet 50 to have at least two different Curie temperatures $T_{c1}$ K and $T_{c2}$ K. The "at least two" means that a magnetized phase capable of being slightly present in the grain boundary phase 40 has a Curie temperature other than $T_{c1}$ K and $T_{c2}$ K.

As to the Curie temperature of the magnetic phase 30, the Curie temperature of one of the core part 32 and the shell part 34 is $T_{c1}$ K, and the Curie temperature of another is $T_{c2}$ K. More specifically, while the Curie temperature of the core part 32 is $T_{c1}$ K, the Curie temperature of the shell part may be $T_{c2}$ K, or while the Curie temperature of the core part 32 is $T_{c2}$ K, the Curie temperature of the shell part may be $T_{c1}$ K. In either case, ease of self-demagnetization of the composite permanent magnet 50 is at an equal level. On the other hand, when the Curie temperature of the core part 32 is $T_{c1}$ K and the Curie temperature of the shell part is $T_{c2}$ K, the self-demagnetized composite permanent magnet 50 is readily remagnetized. The reason therefor is described later.

<Demagnetization Step>

In the method of the present disclosure, when the magnitude of the reluctance torque is equal to or greater than the magnitude of the magnet torque, the temperature of the composite permanent magnet 50 is set at $T_s$ K that is $(T_{c1}-100)$ K or higher and lower than $T_{c2}$ K. In this case, the composite permanent magnet 50 is demagnetized, and a rise in the back electromotive force is suppressed. As a result, dragging loss at the time of high rotation can be reduced.

In order to set the temperature of the composite permanent magnet 50 at $T_s$ K, an electric heater, etc. may be disposed on the motor, or self-generated heat of the motor may be utilized. These are described later.

The composite permanent magnet 50 is disposed on the rotor 10, and therefore it not necessarily easy to detect (measure) its temperature. Accordingly, in the case of disposing an electric heater, etc. on the motor, after previously examining the relationship between the time from the output and start of heating of the electric heater and the temperature of the composite permanent magnet 50, whether the temperature of the composite permanent magnet 50 has reached $T_s$ K may be judged by the time from the start of heating. In the case of utilizing self-generated heat of the motor, similarly, whether the temperature of the composite permanent magnet 50 has reached $T_s$ K may be judged by the time from the start of utilization of self-generated heat. In the case of receiving heat from a device other than the motor, whether the temperature of the composite permanent magnet 50 has reached $T_s$ K may be judged by the time from the start of receiving heat.

Alternatively, after previously examining the relationship between the temperature of a region other than a movable part such as rotor 10, i.e., an immovable part, and the temperature of the composite permanent magnet 50, whether the temperature of the composite permanent magnet 50 has reached $T_s$ K may be judged from the examination results above by detecting the temperature of the immovable part by means of a sensor. The immovable part includes, for example, a motor casing, a bearing casing, and a stator 20. As the temperature sensor, a contact sensor such as thermocouple can be used, but a non-contact sensor such as infrared radiation thermometer may also be used.

As described above, the magnetic phase 30 of the composite permanent magnet 50 has a core part 32 and a shell part 34. Since the Curie temperature of one of the core part 32 and the shell part 34 is $T_{c1}$ K and the Curie temperature of another is $T_{c2}$ K ($<T_{c1}$ K), when the temperature of the composite permanent magnet 50 is set at $T_s$ K that is $(T_{c1}-100)$ K or higher and lower than $T_{c2}$ K, out of the core part 32 and the shell part 34, the portion having a Curie temperature of $T_{c1}$ K undergoes stronger self-demagnetization than the portion having a Curie temperature of $T_{c2}$ K. Incidentally, the temperature of the magnetic phase 30 (core part 32 and shell part 34) should be equivalent to the temperature of the composite permanent magnet 50.

The magnetic phase is gradually self-demagnetized with a rise in the temperature and upon reaching the Curie temperature, the magnetic phase completely loses its magnetism. In the magnetic phase 30, out of the core part 32 and the shell part 34, when the temperature of the portion having a Curie temperature of $T_{c1}$ K becomes $(T_{c1}-100)$ K, self-demagnetization of the portion can be clearly recognized. Furthermore, when the temperature becomes $T_{c1}$ K, the magnetism of the portion is completely lost. From the viewpoint of more reducing the dragging loss at the time of high rotation, it is preferable to achieve stronger self-demagnetization of the magnetic phase 30 and more reduce the rise in the counter electromotive voltage. For this reason, when the magnitude of the reluctance torque is equal to or greater than the magnitude of the magnet torque (at the time of high rotation), the lower limit of the temperature of the composite permanent magnet 50 is preferably $(T_{c1}-75)$ K, more preferably $(T_{c1}-50)$ K, still more preferably $(T_{c1}-25)$ K. The lower limit of the temperature of the composite permanent magnet 50 may be $T_{c1}$ K. At this time, the portion having a Curie temperature of $T_{c1}$ K completely loses the magnetism.

On the other hand, when the temperature of the composite permanent magnet 50 is less than $T_{c2}$ K, out of the core part 32 and the shell part 34, the portion having a Curie temperature of $T_{c2}$ K does not completely lose the magnetism. Accordingly, when the motor operating state shifts from high rotation to low rotation, the portion having a Curie temperature of $T_{c1}$ K can be remagnetized by a magnetic flux of, out of the core part 32 and the shell part 34, the portion having a Curie temperature of $T_{c2}$ K. From the viewpoint of preventing the portion having a Curie temperature of $T_{c2}$ K from completely losing the magnetism, the temperature of the composite permanent magnet 50 may be $(T_{c2}-5)$ K or less, $(T_{c2}-10)$ K or less, or $(T_{c2}-20)$ K or less. The method for remagnetization is described later.

At the time of remagnetizing the portion having a Curie temperature of $T_{c1}$ K, the magnetic flux of the portion having a Curie temperature of $T_{c2}$ K is preferably higher. In order to demagnetize the portion having a Curie temperature of $T_{c1}$ K, the temperature of the composite permanent magnet 50 is set at $T_s$ K that is $(T_{c1}-100)$ K or higher and lower than $T_{c2}$ K. At this time, for as much reducing a decrease in the magnetic flux of the portion having a Curie temperature of $T_{c2}$ K as possible, the temperature of the composite permanent magnet 50 is preferably lower as long as it is $T_{c1}$ K or higher. More specifically, when the magnitude of the reluctance torque is equal to or greater than the magnitude of the magnet torque, the temperature of the composite permanent magnet 50 is preferably $(T_{c1}+50)$ K or lower, more preferably $(T_{c1}+30)$ K or lower, still more preferably $(T_{c1}+10)$ K or lower.

For example, in the case where the Curie temperature of the core part 32 is $T_{c1}$ K and the Curie temperature of the shell part is $T_{c2}$ K, when the temperature of the composite permanent magnet 50 is set at $T_s$ K that is $(T_{c1}-100)$ K or higher and lower than $T_{c2}$ K, the core part 32 undergoes stronger self-demagnetization than the shell part 34. On the other hand, since the shell part 34 does not completely lose the magnetism, the core part 32 can be remagnetized by a magnetic flux of the shell part 34.

Contrary to the embodiment above, in the case where the Curie temperature of the core part 32 is $T_{c2}$ K and the Curie temperature of the shell part is $T_{c1}$ K, when the temperature of the composite permanent magnet 50 is set at $T_s$ K that is $(T_{c1}-100)$ K or higher and lower than $T_{c2}$ K, the shell part 34 undergoes stronger self-demagnetization than the core part 32. On the other hand, since the core part 32 does not completely lose the magnetism, the shell part 34 can be remagnetized by a magnetic flux of the core part 32.

<Remagnetization Step>

In the method of the present disclosure, when the magnitude of the reluctance torque is less than the magnitude of the magnet torque (at the time of low rotation in motor), the temperature of the composite permanent magnet 50 is set at lower than the temperature $T_s$ K or $T_{c1}$ K, whichever is lower. In this case, the portion having a Curie temperature of $T_{c1}$ K can be remagnetized by a magnetic flux of, out of the core part 32 and the shell part 34, the portion having a Curie temperature of $T_{c2}$ K.

In the present description, the "remagnetization" encompasses not only the case of remagnetizing a portion where the magnetism is completely lost, but also the case of increasing (recovering) a magnetic flux of a portion where the magnetic flux is decreased (demagnetized portion). The "case of increasing (recovering) a magnetic flux of a portion where the magnetic flux is decreased (demagnetized portion)" includes, for example, the following case. In the case where the magnitude of the reluctance torque is equal to or greater than the magnitude of the magnet torque (at the time of high rotation), when the temperature of the composite permanent magnet 50 is set at $(T_{c1}-100)$ K, the portion having a Curie temperature of $T_{c1}$ K does not lose all the magnetism but is only subject to a decrease in the magnetic flux. In this state, when the magnitude of the reluctance torque is less than the magnitude of the magnet torque and the temperature is set at $(T_{c1}-100)$ K, the magnetic flux of the portion having a Curie temperature of $T_{c1}$ K increases (is recovered).

In relation to the definition of "remagnetization", the reason why the temperature of the composite permanent magnet 50 at the time of remagnetization is specified not stating "the temperature of the composite permanent magnet 50 is set at lower than $T_{c1}$ K" but stating "the temperature of the composite permanent magnet 50 is set at lower than the temperature $T_s$ K or $T_{c1}$ K, whichever is lower" is described below.

In the case where the magnitude of the reluctance torque is less than the magnitude of the magnet torque (at the time of low rotation), when the temperature of the composite permanent magnet 50 is set at $T_s$ K that is $(T_{c1}-100)$ or higher and lower than $T_{c1}$ K, the portion having a Curie temperature of $T_{c1}$ K does not completely lose the magnetism but stays at demagnetization. In such a case, when the temperature of the composite permanent magnet 50 at the time of remagnetization is specified stating "the temperature of the composite permanent magnet 50 is set at lower than $T_{c1}$ K", $T_s$ K<$T_{c1}$ K is established. This leads to a further rise in the temperature of the composite permanent magnet 50 at the time of remagnetization, making it impossible to remagnetize the composite permanent magnet 50. In such a case, at the time of remagnetization, only setting the temperature of the composite permanent magnet 50 at lower than $T_{c1}$ K is insufficient, but it is necessary to set the temperature at lower than $T_s$ K.

On the other hand, in the case where the magnitude of the reluctance torque is less than the magnitude of the magnet torque (at the time of low rotation), when the temperature of the composite permanent magnet 50 is set at $T_s$ K that is $T_{c1}$ or higher and lower than $T_{c2}$ K, $T_{c1}$ K<$T_s$ K is established, and it may be sufficient if the temperature of the composite permanent magnet 50 at the time of remagnetization is set at lower than $T_{c1}$ K.

In the following description, "the temperature $T_s$ K or $T_{c1}$ K, whichever is lower" in "the temperature of the composite permanent magnet 50 is set at lower than the temperature $T_s$ K or $T_{c1}$ K, whichever is lower" is sometimes conveniently referred to as "$T_m$ K". That is, $T_m$ K means "the temperature $T_s$ K or $T_{c1}$ K, whichever is lower".

In order to set the temperature of the composite permanent magnet 50 at lower than $T_m$ K, forced cooling may be applied by disposing a cooling circuit, etc. in the motor, or an operation (hereinafter, sometimes referred to as "heat application") performed for setting the temperature of the composite permanent magnet 50 at $T_s$ K at the time of high rotation may be stopped. The motor is structured to radiate self-generated heat, and therefore only stopping of heat application leads to cooling of the composite permanent magnet 50, as a result, the temperature can be set at lower than $T_m$ K. These are described later. Incidentally, when the magnitude of the reluctance torque is less than the magnitude of the magnet torque, as long as the temperature of the composite permanent magnet 50 is lower than $T_m$ K, the lower limit of the temperature of the composite permanent magnet 50 is not particularly limited, but the lower limit is generally room temperature (298 K). Because, in order to set the temperature of the composite permanent magnet 50 at room temperature or lower, a special cooling system is necessary.

The composite permanent magnet 50 is disposed on the rotor 10, and therefore it is not necessarily easy to detect (measure) its temperature. Accordingly, in the case of applying forced cooling, after previously examining, for example, the relationship between the time from start of forced cooling and the temperature of the composite permanent magnet 50, whether the temperature of the composite permanent magnet 50 has reached lower than $T_m$ K may be judged by the time from the start of forced cooling. In the case of stopping heat application to the motor, similarly, whether the temperature of the composite permanent magnet 50 has reached lower than $T_m$ K may be judged by the time from the start of stopping of heat application.

Alternatively, after previously examining the relationship between the temperature of a region other than a movable part such as rotor 10, i.e., an immovable part, and the temperature of the composite permanent magnet 50, whether the temperature of the composite permanent magnet 50 has reached lower than $T_m$ K may be judged from the examination results above by detecting the temperature of the immovable part by means of a sensor. The immovable part includes, for example, a motor casing, a bearing casing, and a stator 20. As the sensor, a contact sensor such as thermocouple can be used, but a non-contact sensor such as infrared sensor may also be used.

From the viewpoint of achieving remagnetization, when the magnitude of the reluctance torque is less than the magnitude of the magnet torque (at the time of low rotation in motor), the temperature of the composite permanent magnet 50 may be set at $(T_m-5)$ K or lower, $(T_m-10)$ or lower, or $(T_m-20)$ K or lower.

High torque can also be obtained at the time of low rotation in motor by remagnetizing the composite permanent magnet 50 in this way.

For example, in the case where the Curie temperature of the core part 32 is $T_{c1}$ K and the Curie temperature of the shell part is $T_{c2}$ K, when the temperature of the core part 32 having underwent self-demagnetization at $T_s$ K that is $(T_{c1}-100)$ K or higher and lower than $T_{c2}$ K has reached lower than $T_m$ K, the core part 32 is remagnetized by a magnetic flux of the shell part 34. In this embodiment, the shell part 34 surrounds the core part 32. Accordingly, compared with the below-described embodiment, in this embodiment, a magnetic flux of the shell part 34 is likely to act on the core part 32, and the remagnetization efficiency is therefore high.

Contrary to the embodiment above, in the case where the Curie temperature of the core part 32 is $T_{c2}$ K and the Curie temperature of the shell part is $T_{c1}$ K, when the temperature of the shell part 34 having underwent self-demagnetization at a composite permanent magnet 50 temperature $T_s$ K that is $(T_{c1}-100)$ K or higher and lower than $T_{c2}$ K has reached lower than $T_m$ K, the shell part 34 is remagnetized by a magnetic flux of the core part 32.

As described in the foregoing pages, in the method of the present disclosure, the temperature of the composite permanent magnet 50 is set at $T_s$ K at the time of high rotation to cause self-demagnetization of the composite permanent magnet 50, whereas the temperature of the composite permanent magnet is set at lower than $T_m$ K at the time of low rotation to cause remagnetization of the composite permanent magnet 50, and a variable magnetic flux motor is thereby realized.

<Attachment and Detachment of Heat Insulating Material>

In order to set the temperature of the composite permanent magnet 50 at $T_s$ K, heat may be applied to the composite permanent magnet 50 by utilizing the self-generated heat of the motor. For example, when the magnitude of the reluctance torque is equal to or greater than the magnitude of the magnet torque, the temperature of the composite permanent magnet 50 may be set at $T_s$ K that is $(T_{c1}-100)$ K or higher and lower than $T_{c2}$ K, by disposing a heat insulating material on the motor. In addition, when the magnitude of the reluctance torque is less than the magnitude of the magnetic torque, the temperature of the composite permanent magnet 50 may be set at lower than $T_m$ K by removing the heat insulating material from the motor. This operation makes it unnecessary to provide a special heating source so as to change the temperature of the composite permanent magnet 50. Furthermore, the self-generated heat of the motor can be effectively utilized without releasing it to the atmosphere.

When the motor operates at high rotation, self-heating occurs due to a rise in the counter electromotive voltage. When the temperature of the composite permanent magnet 50 becomes higher than the Curie temperatures of both the core part 32 and the shell part 34, i.e., becomes higher than $T_{c2}$ K, the composite permanent magnet 50 completely loses the magnetism. Then, the motor does not work. Accordingly, the motor is designed to be capable of releasing self-generated heat. For example, fins are arranged on a motor casing, or the motor is disposed at a position easy to contact with ambient air.

However, as long as the temperature of the composite permanent magnet 50 does not exceed $T_{c2}$ K, the temperature of the composite permanent magnet 50 can be raised by disposing a heat insulating material on the motor and utilizing the self-generated heat of the motor so as to cause self-demagnetization of the core part 32 and/or the shell part 34. On the other hand, when the motor is shifted from high rotation to low rotation, self-generated heat can be released by removing the heat insulating material from the motor, and therefore the temperature of the composite permanent magnet 50 can be set at lower than $T_m$ K. As a result, remagnetization of the core part 32 or the shell part 34 can be achieved.

The type, etc. of the heat insulating material are not particularly limited. The type of the heat insulating material includes, for example, a fibrous material such as glass wool, and a foamed plastic material such as hard urethane.

<Attachment and Detachment of Heat Dissipating Member>

Onto the motor, a heat radiation member such as cooling fin is often attached. The temperature of the composite permanent magnet 50 may be changed by attachment or detachment of a heat radiation member to or from the motor. That is, the temperature of the composite permanent magnet 50 may be raised by removing a heat radiation member from the motor, or the temperature of the composite permanent magnet 50 may be lowered by repositioning a heat radiation member on the motor.

More specifically, when the magnitude of the reluctance torque is equal to or greater than the magnitude of the magnet torque, a heat radiation member of the motor may be removed so as to set the temperature of the composite permanent magnet at $T_s$ K that is $(T_{c1}-100)$ K or higher and lower than $T_{c2}$ K. On the other hand, when the magnitude of the reluctance torque is less than the magnitude of the magnetic torque, a heat radiation member may be repositioned on the motor so as to set the temperature of the composite permanent magnet at lower than the temperature $T_s$ K or $T_{c1}$ K, whichever is lower.

The material, etc. of the heat radiation member are not particularly limited. The material of the heat radiation member includes, for example, an AlN (aluminum nitride) ceramic material, a metal material such as aluminum or aluminum alloy, and an organic material having dispersed therein an AlN or BN (boron nitride) filler.

<Utilization of Cooling Fluid>

An electric-powered vehicle is often equipped with a cooling device, etc. for an invertor, and a cooling fluid circulates in the cooling device. This cooling fluid may be utilized for changing the temperature of the composite permanent magnet 50 in the motor. In the present description, the electric-powered vehicle means a vehicle having at least one motor, such as electric vehicle, fuel cell vehicle and hybrid vehicle.

The temperature of the composite permanent magnet 50 in the motor disposed on an electric-powered vehicle may be changed, for example, as follows.

When the magnitude of the reluctance torque is equal to or greater than the magnitude of the magnet torque, the flow rate of the cooling fluid may be decreased to weaken the cooling of the composite permanent magnet 50 and thereby raise the temperature of the composite permanent magnet 50. In this case, when the motor operating state shifts from low rotation to high rotation, self-demagnetization of the core part 32 and/or the shell part 34 can be achieved by raising the temperature of the composite permanent magnet 50 to $T_s$ K that is $(T_{c1}-100)$ K or higher and lower than $T_{c2}$ K. In addition, when the magnitude of the reluctance torque is less than the magnitude of the magnet torque, the flow rate of the lubricating fluid is increased to strengthen the cooling of the composite permanent magnet 50 and thereby lower the temperature of the composite permanent magnet 50. In this case, when the motor operating state shifts from high rotation to low rotation, remagnetization of the core part 32 or the shell part 34 can be achieved by lowering the temperature of the composite permanent magnet 50 to less than $T_m$ K.

The cooling fluid is introduced into the motor by means of a pump, etc. from a cooling device disposed on the electric-powered vehicle. The cooling device may be shared by cooling of the inverter or may be exclusively used for cooling of the motor. The cooling fluid is not particularly limited as long as it can cool the motor, but the cooling fluid is typically water. Water may contain an antifreeze liquid.

In the case where the electric-powered vehicle is a hybrid vehicle having an engine and a motor, a lubricating fluid filled inside a power dividing mechanism connecting the engine and the motor can be utilized as the cooling fluid. That is, in the case where a motor is disposed on a hybrid automobile, a lubricating fluid of a power dividing mechanism can be utilized for changing the temperature of the composite permanent magnet 50.

Figure 3:
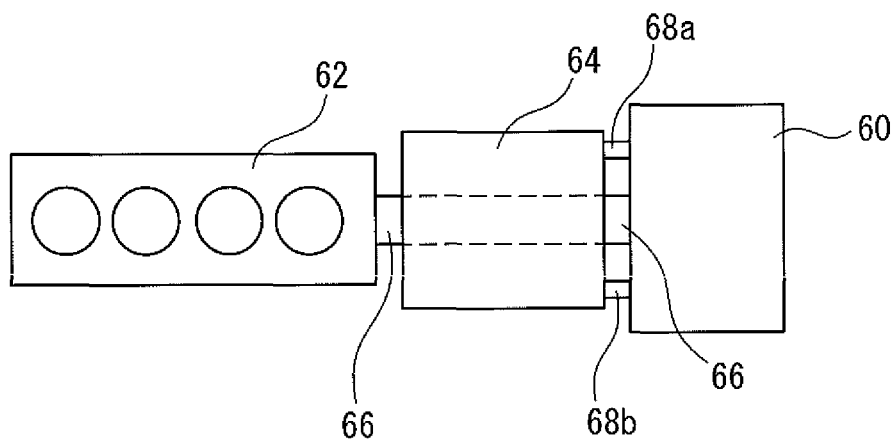
FIG. 3 is a schematic diagram illustrating an example of the drive mechanism of a hybrid automobile.

FIG. 3 is a schematic diagram illustrating an example of the drive mechanism of a hybrid automobile. In the embodiment illustrated in FIG. 3, a motor 60 and an engine 62 are connected to a power dividing mechanism 64 via a connecting shaft 66. A planetary gear (not shown) is disposed inside the power dividing mechanism 64, and the power is split by the gear. The planetary gear is lubricated by a lubricating fluid.

The lubricating fluid is at a relatively low temperature (from normal temperature to about 50° C.). Accordingly, when lubricating fluid passages 68a and 68b are disposed as illustrated in FIG. 3 and a lubricating fluid is supplied to the motor 60, the lubricating fluid can be utilized as a medium for cooling the composite permanent magnet 50.

In addition, the amount of the lubricating fluid is large enough to be utilized as a cooling medium, and therefore the composite permanent magnet 50 can be efficiently cooled. Furthermore, the temperature of the composite permanent magnet 50 can be exactly controlled by controlling the flow rate of the lubricating fluid.

For example, when the magnitude of the reluctance torque is equal to or greater than the magnitude of the magnet torque, the flow rate of the lubricating fluid is decreased to weaken the cooling of the composite permanent magnet 50 and thereby raise the temperature of the composite permanent magnet 50. In this case, when the motor operating state shifts from low rotation to high rotation, self-demagnetization of the core part 32 and/or the shell part 34 can be achieved by raising the temperature of the composite permanent magnet 50 to $T_s$ K that is $(T_{c1}-100)$ K or higher and lower than $T_{c2}$ K. In addition, when the magnitude of the reluctance torque is less than the magnitude of the magnet torque, the flow rate of the lubricating fluid is increased to strengthen the cooling of the composite permanent magnet 50 and thereby lower the temperature of the composite permanent magnet 50. In this case, when the motor operating state shifts from high rotation to low rotation, remagnetization of the core part 32 or the shell part 34 can be achieved by lowering the temperature of the composite permanent magnet 50 to lower than $T_m$ K.

<Detection of Composite Permanent Magnet Temperature>

The temperature of the composite permanent magnet 50 may also be detected by a temperature sensor disposed inside or outside the motor. In this case, the composite permanent magnet 50 can be more properly demagnetized and/or remagnetized.

Since the composite permanent magnet 50 is disposed on the rotor 10, a non-contact temperature sensor is preferably used. The non-contact sensor includes, for example, an infrared radiation thermometer.

<Composite Permanent Magnet>

The composite permanent magnet 50 is not particularly limited in its component composition, etc. as long as the above-described constituent features are satisfied. The composite permanent magnet 50 includes, for example, an alnico magnet, a ferrite magnet, and a rare earth magnet. The rare earth magnet includes, for example, a rare earth magnet having a ThMn$_{12}$-type crystal structure, or a rare earth magnet having a magnetic phase represented by $R_2T_{14}B$ (wherein R is a rare earth element, T is one or more selected from the group consisting of Fe, Co and Ni, and B is boron). Note here that in the present description, the rare earth element refers to 17 elements of Sc, Y, La, Ce, Pr, Nd, Pm, Sm, Eu, Gd, Tb, Dy, Ho, Er, Tm, Yb, and Lu.

In the present description, as the embodiment of the composite permanent magnet 50, for example, a rare earth magnet A (embodiment 1) and a rare earth magnet B (embodiment 2) are described below, but the present disclosure is not limited thereto. As to the technical matters regarding the rare earth magnet A, Japanese Patent No. 6,183,457 (JP6183457B2) can be referred to.

<Rare Earth Magnet a (Embodiment 1)>

The rare earth magnet A has an overall composition represented by $(R^2_{(1-x)}R^1_x)_y Fe_{(100-y-w-z-v)} Co_w B_z M_v$. The overall composition means the total composition of the magnetic phase 30 and the grain boundary phase 40 in FIG. 2.

In the composition formula above, $R^2$ represents one or more selected from the group consisting of Nd and Pr, $R^1$ represents one or more selected from group consisting of Ce, La, Gd, Y and Sc, and M represents one or more selected from the group consisting of Ga, Al, Cu, Au, Ag, Zn, In and Mn and an unavoidable impurity.

The rare earth magnet A is obtained by allowing, as a modifier, a low-melting-point alloy containing $R^2$ to diffuse and infiltrate into a rare earth magnet precursor having a magnetic phase represented by $R^1_2(Fe, Co)_{14}B$ or $(R^2, R^1)_2(Fe, Co)_{14}B$. At this time, $R^1$ in the magnetic phase of the rare earth magnet precursor and $R^2$ in the modifier replace each other. This replacement occurs only near the surface of the magnetic phase of the rare earth magnet precursor. Accordingly, as illustrated in FIG. 2, a shell part 34 in which $R^1$ in the magnetic phase of the rare earth magnet precursor is replaced by $R^2$ in the modifier, and a core part 32 which is directly the magnetic phase of the rare earth magnet precursor, are formed. Through such a formation process, a larger amount of $R^1$ remains in the core part 32 than in the shell part 34. Consequently, $R^1/(R^2+R^1)$ in the core part 32 is larger than $R^1/(R^2+R^1)$ in the shell part 34. Here, $R^1/(R^2+R^1)$ indicates the ratio (molar ratio) of the content of $R^1$ to the total content of $R^2$ and $R^1$. Incidentally, in the case where the rare earth magnet precursor has a magnetic phase represented by $R^2{}_2(Fe, Co)_{14}B$, the above-described replacement does not occur. As a result, the magnetic phase never has a core part and a shell part.

As described above, $R^2$ is one or more selected from the group consisting of Nd and Pr, and $R^1$ is one or more selected from group consisting of Ce, La, Gd, Y and Sc. That is, $R^2$ is a rare earth element other than light rare earth elements, and $R^1$ is a light rare earth element. Accordingly, a larger amount of a light rare earth element remains in the core part 32 than in the shell part 34.

In the rare earth magnet, when the content of the light rare earth element in the magnetic phase is increased, the Curie temperature of the rare earth magnet lowers. Accordingly, in the rare earth magnet A, the Curie temperature of the core part 32 is $T_{c1}$ K, and the Curie temperature of the shell part 34 is $T_{c2}$ K ($>T_{c1}$ K).

The magnetization and anisotropic magnetic field of the magnetic phase composed of a rare earth element other than light rare earth elements are higher than the magnetization and anisotropic magnetic filed of the magnetic phase composed of a light rare earth element. Accordingly, in the rare earth magnet A, $R^2$ (rare earth element other than light rare earth elements) is allowed to diffuse and infiltrate into a rare earth magnet precursor having a magnetic phase containing $R^1$ (light rare earth element), and the magnetization and anisotropic magnetic field of the obtained composite permanent magnet 50 are thereby enhanced. For example, in the case where the motor is used for driving an automobile, a high torque is required during starting (at the time of low rotation), and therefore the magnetization and anisotropic magnetic field of the composite permanent magnet 50 disposed on the rotor 10 are preferably higher. For this reason, the rare earth magnet A where a larger amount of light rare earth element remains in the core part 32 than in the shell part 34 is advantageous to the composite permanent magnet disposed on the rotor 10.

The formula of the overall composition above shows the total composition of the magnetic phase 30 and the grain boundary phase 40 after diffusion and infiltration of the modifier are completed. In the formula of the overall composition above, the value of x indicates the ratio (molar ratio) of the content of $R^1$ to the total content of $R^2$ and $R^1$; the value of y indicates the total content (at %) of $R^2$ and $R^1$; the value of w indicates the content (at %) of Co; the value of z indicates the content (at %) of B (boron); and the value of v indicates the content (at %) of M.

The modifier includes a low-melting-point alloy such as Nd—Cu alloy, Pr—Cu alloy, Nd—Pr—Cu alloy, Nd—Al alloy, Pr—Al alloy, Nd—Pr—Al alloy, Nd—Co alloy, Pr—Co alloy and Nd—Pr—Co alloy. Accordingly, M in the overall composition above contains an element (e.g., Cu and/or Al) other than $R^2$ contained in the low-melting-point alloy. In the case where a low-melting-point alloy such as Nd—Co alloy, Pr—Co alloy and/or Nd—Pr—Co alloy is used as the modifier and M is not contained in the rare earth magnet precursor, the content v of M is 0 at %.

The rare earth magnet A is obtained by allowing a modifier containing $R^2$ (a rare earth element other than light rare earth elements) to diffuse and infiltrate into a rare earth magnet precursor having a magnetic phase containing $R^1$ (a light rare earth element). Since the formula of the overall composition above shows the composition after diffusion and infiltration of the modifier are completed, the rare earth magnet A is sufficient if both $R^1$ and $R^2$ are present therein as the rare earth element. Accordingly, in the formula of the overall composition above, the ratio (molar ratio) x of the content of $R^1$ to the total content of $R^2$ and $R^1$ may be 0<x<1. That is, x may be sufficient if it is not 0 and if it is not 1. When 0<x<1, the composite permanent magnet 50 has at least two different Curie temperatures $T_{c1}$ K and $T_{c2}$ K (provided that $T_{c1}$ K<$T_{c2}$ K). The difference between $T_{c2}$ K and $T_{c2}$ K may be 20 K or more, 60 K or more, 100 K or more, or 140 K or more, and may be 200 K or less, 190 K or less, or 180 K or less. In the composite permanent magnet 50 having such Curie temperatures, x may be typically 0.2 or more, 0.3 or more, or 0.4 or more, and may be 0.9 or less, 0.7 or less, or 0.5 or less.

In the formula of the overall composition above, y is the total content of $R^2$ and R', w is the content of Co, z is the content of B, v is the content of M, and each of the values of y, w, z and v is at %. As for these values, when y=from 12 to 20, z=from 5.6 to 6.5, w=from 0 to 8, and v=from 0 to 2, the composite permanent magnet 50 can have a magnet phase 30 and a grain boundary phase 40 present around the magnetic phase 30.

$R^2$ in the modifier diffuses and infiltrates not only into a grain boundary phase of the rare earth magnet precursor but also into a magnetic phase of the rare earth magnet precursor to form a core part 32 and a shell part 34 as illustrated in FIG. 2. Although not bound by theory, the rare earth element $R^1$ in the rare earth magnet precursor and the rare earth element $R^2$ in the modifier differ in the type of the rare earth element. Accordingly, $R^2$ in the modifier and $R^1$ in the magnetic phase of the rare earth magnet precursor replace each other. As a result, $R^2$ in the modifier diffuses and infiltrates even into the magnetic phase of the rare earth magnet precursor.

From the viewpoint of ensuring the coercivity of the rare earth magnet A, the average particle diameter of the magnetic phase 30 of the rare earth magnet A is preferably 1,000 nm or less. The particle diameter of the magnetic phase of the rare earth magnet precursor and the particle diameter of the magnetic phase 30 of the rare earth magnet A obtained by diffusion and infiltration of a modifier are considered to be substantially equal.

The average particle diameter of the magnetic phase 30 of the rare earth magnet A may be 1 nm or more, 10 nm or more, 50 nm or more, or 100 nm or more, and may be 900 nm or less, 700 nm or less, 500 nm or less, or 300 nm or less. Here, the "average particle diameter" is, for example, an average value of longitudinal lengths of magnetic phases 30 illustrated in FIG. 2.

The rare earth magnet precursor is prepared, for example, as follows, but the present disclosure is not limited thereto. For example, a thin strip is prepared by a liquid quenching method or a strip casting method, and the thin strip is hot compression molded (sintered) to obtain a molded body (sintered body). Before the hot compression molding, the thin strip may be coarsely pulverized. Furthermore, the molded body is optionally subjected to hot hard working (hot plastic working) at a rolling reduction of 30 to 75% to obtain the rare earth magnet precursor. In this case, the rare earth magnet precursor has a magnetization easy axis in the hot hard working direction (compression direction). The size of the magnetic phase 30 of the rare earth magnet A is substantially equal to the size of the magnetic phase of the rare earth magnet precursor. Accordingly, in order to make the average particle diameter of the magnetic phase of the rare earth magnet A be 1,000 nm or less, at the time of preparation of the rare earth magnet precursor, the thin strip is preferably prepared by a liquid quenching method.

<Rare Earth Magnet B (Embodiment 2)>

As described above, in order to obtain the rare earth magnet A (embodiment 1), a low-melting-point alloy containing $R^2$ is allowed, as a modifier, to diffuse and infiltrate into a rare earth magnet precursor having a magnetic phase represented by $R^1{}_2$(Fe, Co)$_{14}$B or ($R^2$, $R^1$)$_2$(Fe, Co)$_{14}$B. Instead thereof, a low-melting-point alloy containing $R^1$ may be allowed, as a modifier, to diffuse and infiltrate into a rare earth magnet precursor having a magnetic phase represented by $R^2{}_2$(Fe, Co)$_{14}$B or ($R^2$, $R^1$)$_2$(Fe, Co)$_{14}$B. In the following, a rare earth magnet B (embodiment 2) obtained by allowing, as a modifier, a low-melting-point alloy containing $R^1$ to diffuse and infiltrate into a rare earth magnet precursor having a magnetic phase represented by $R^2{}_2$(Fe, Co)$_{14}$B or ($R^2$, $R^1$)$_2$(Fe, Co)$_{14}$B is described.

The rare earth magnet B has an overall composition represented by $(R^2{}_{(1-x)}R^1{}_x)_y$Fe$_{(100-y-w-z-v)}$Co$_w$B$_z$M$_v$. The overall composition means the total composition of the magnetic phase 30 and the grain boundary phase 40 in FIG. 2.

In the composition formula above, $R^2$ represents one or more selected from the group consisting of Nd and Pr, $R^1$ represents one or more selected from group consisting of Ce, La, Gd, Y and Sc, and M represents one or more selected from the group consisting of Ga, Al, Cu, Au, Ag, Zn, In and Mn and an unavoidable impurity.

The rare earth magnet B is obtained as described above by allowing, as a modifier, a low-melting-point alloy containing $R^1$ to diffuse and infiltrate into a rare earth magnet precursor having a magnetic phase represented by $R^2{}_2$(Fe, Co)$_{14}$B or ($R^2$, $R^1$)$_2$(Fe, Co)$_{14}$B. At this time, $R^2$ in the magnetic phase of the rare earth magnet precursor and $R^1$ in the modifier replace each other. This replacement occurs only near the surface of the magnetic phase of the rare earth magnet precursor. Accordingly, as illustrated in FIG. 2, a shell part 34 in which $R^2$ in the magnetic phase of the rare earth magnet precursor is replaced by $R^1$ in the modifier, and a core part 32 which is directly the magnetic phase of the rare earth magnet precursor, are formed. That is, a larger amount of $R^2$ remains in the core part 32 than in the shell part 34. Consequently, $R^2/(R^2+R^1)$ in the core part 32 is larger than $R^2/(R^2+R^1)$ in the shell part 34. Incidentally, in the case where the rare earth magnet precursor has a magnetic phase represented by $R^1{}_2$(Fe, Co)$_{14}$B, the above-described replacement does not occur. As a result, the magnetic phase never has a core part and a shell part.

As described above, $R^2$ is one or more selected from the group consisting of Nd and Pr, and $R^1$ is one or more selected from group consisting of Ce, La, Gd, Y and Sc. That is, $R^2$ is a rare earth element other than light rare earth elements, and $R^1$ is a light rare earth element. Accordingly, a larger amount of a rare earth element other than light rare earth elements remains in the core part 32 than in the shell part 34. In other words, a larger amount of a rare earth element is present in the shell part 34 than in the core part 32.

In the rare earth magnet, when the content of the light rare earth element in the magnetic phase is increased, the Curie temperature of the rare earth magnet lowers. Accordingly, in the rare earth magnet B (embodiment 2), the Curie temperature of the shell part 34 is $T_{c1}$ K, and the Curie temperature of the core part 32 is $T_{c2}$ K ($>T_{c1}$ K).

The formula of the overall composition above shows the total composition of the magnetic phase 30 and the grain boundary phase 40 after diffusion and infiltration of the modifier are completed. In the formula of the overall composition above, the value of x indicates the ratio (molar ratio) of the content of $R^1$ to the total content of $R^2$ and $R^1$; the value of y indicates the total content (at %) of $R^2$ and $R^1$; the value of w indicates the content (at %) of Co; the value of z indicates the content (at %) of B (boron); and the value of v indicates the content (at %) of M.

The modifier includes a low-melting-point alloy such as Ce—Cu alloy, La—Cu alloy, Ce—La—Cu alloy, Ce—Al alloy, La—Al alloy, Ce—La—Al alloy, Ce—Co alloy, La—Co alloy, Ce—La—Co alloy, Gd—Cu alloy, Y—Cu alloy and Sc—Cu alloy. Accordingly, M in the overall composition above contains an element (e.g., Cu and/or Al) other than $R^1$ contained in the low-melting-point alloy. In the case where a Ce—Co alloy, a La—Co alloy and/or a Ce—La—Co alloy is used as the modifier and M is not contained in the rare earth magnet precursor, the content v of M is 0 at %.

The rare earth magnet B is obtained by allowing a modifier containing $R^1$ (a light rare earth element) to diffuse and infiltrate into a rare earth magnet precursor having a magnetic phase containing $R^2$ (a rare earth element other than light rare earth elements). Since the formula of the overall composition above shows the composition after diffusion and infiltration of the modifier are completed, the rare earth magnet B is sufficient if $R^1$ and $R^2$ are present together therein as the rare earth element. Accordingly, in the formula of the overall composition above, the ratio (molar ratio) x of the content of $R^1$ to the total content of $R^2$ and $R^1$ may be 0<x<1. That is, x may be sufficient if it is not 0 and if it is not 1. When 0<x<1, the composite permanent magnet 50 has at least two different Curie temperatures $T_{c1}$ K and $T_{c2}$ K (provided that $T_{c1}$ K<$T_{c2}$ K). The difference between $T_{c2}$ K and $T_{c2}$ K may be 20 K or more, 60 K or more, 100 K or more, or 140 K or more, and may be 200 K or less, 180 K or less, or 160 K or less. In the composite permanent magnet 50 having such Curie temperatures, x may be typically 0.2 or more, 0.3 or more, or 0.4 or more, and may be 0.9 or less, 0.7 or less, or 0.5 or less.

In the formula of the overall composition above, y is the total content of $R^2$ and $R^1$, w is the content of Co, z is the content of B, v is the content of M, and each of the values of y, w, z and v is at %. As for these values, when y=from 12 to 20, z=from 5.6 to 6.5, w=from 0 to 8, and v=from 0 to 2, the composite permanent magnet 50 can have a magnet phase 30 and a grain boundary phase 40 present around the magnetic phase 30.

$R^1$ in the modifier diffuses and infiltrates not only into a grain boundary phase of the rare earth magnet precursor but also into a magnetic phase of the rare earth magnet precursor to form a core part 32 and a shell part 34 as illustrated in FIG. 2. Although not bound by theory, the rare earth element $R^1$ in the rare earth magnet precursor and the rare earth element $R^2$ in the modifier differ in the type of the rare earth element. Accordingly, $R^2$ in the modifier and $R^1$ in the magnetic phase of the rare earth magnet precursor replace each other. As a result, $R^2$ in the modifier diffuses and infiltrate even into the magnetic phase of the rare earth magnet precursor.

From the viewpoint of ensuring the coercivity of the rare earth magnet A, the average particle diameter of the magnetic phase 30 of the rare earth magnet A is preferably 1,000 nm or less. The particle diameter of the magnetic phase of the rare earth magnet precursor and the particle diameter of the magnetic phase of the rare earth magnet B obtained by diffusion and infiltration of a modifier are considered to be substantially equal.

The average particle diameter of the magnetic phase 30 of the rare earth magnet B may be 1 nm or more, 10 nm or more, 50 nm or more, or 100 nm or more, and may be 900 nm or less, 700 nm or less, 500 nm or less, or 300 nm or less. Here, the "average particle diameter" is, for example, an average value of longitudinal lengths of magnetic phases 30 illustrated in FIG. 2.

The rare earth magnet precursor is prepared, for example, as follows, but the present disclosure is not limited thereto. For example, a thin strip is prepared by a liquid quenching method or a strip casting method, and the thin strip is hot compression molded (sintered) to obtain a molded body. Before the hot compression molding, the thin strip may be coarsely pulverized. Furthermore, the molded body is optionally subjected to hot hard working (hot plastic working) at a rolling reduction of 30 to 80% to obtain the rare earth magnet precursor. In this case, the rare earth magnet precursor has a magnetization easy axis in the hot hard working direction (compression direction). The size of the magnetic phase 30 of the rare earth magnet B is substantially equal to the size of the magnetic phase of the rare earth magnet precursor. Accordingly, in order to make the average particle diameter of the magnetic phase of the rare earth magnet A be 1,000 nm or less, at the time of preparation of the rare earth magnet precursor, the thin strip is preferably prepared by a liquid quenching method.

EXAMPLES

The motor control method of the present disclosure is described more specifically below by referring to Example and Comparative Example. However, the motor control method of the present disclosure is not limited to the conditions used in the following Example.
<<Preparation of Sample>>
As the sample, permanent magnets of Example and Comparative Example were prepared in the following manner.
<Preparation of Permanent Magnet of Example>
A molten alloy having a composition represented by $Ce_{13.80}Fe_{75.70}Co_{4.46}B_{5.66}Ga_{0.38}$ was liquid-quenched using a single roll to obtain a ribbon. The liquid quenching was performed under the conditions of a molten alloy temperature of 1,470° C. and a roll circumferential speed of 30 m/s.

The ribbon was pulverized into a powder with a particle diameter of 200 to 600 μm, and the powder was sintered to obtain a sintered body. The sintering was performed under the conditions of a temperature of 930 K, a pressure of 400 MPa, and a pressure holding time of 5 minutes.

The sintered body was subjected to hot hard working to obtain a rare earth magnet precursor. The hot hard working was performed under the conditions of a temperature of 1,050 K, a rolling reduction of 75%, and a strain rate of 0.1/s. The rare earth magnet precursor had a magnetization easy axis in the hot hard working direction (compression direction).

A modifier (low-melting-point alloy) was put into contact with the rare earth magnet precursor in the magnetization hard axis direction and heat-treated for diffusion and infiltration at 970 K over 6 hours in an argon atmosphere. The composition of the modifier (low-melting-point alloy) was $Nd_{70}Cu_{30}$.

<Preparation of Permanent Magnet of Comparative Example>
A molten alloy having a composition represented by $Nd_{13.80}Fe_{75.71}Co_{4.46}B_{5.66}Ga_{0.38}$ was liquid-quenched using a single roll to obtain a ribbon. The liquid quenching was performed under the conditions of a molten alloy temperature of 1,470° C. and a roll circumferential speed of 30 m/s.

The ribbon was pulverized into a powder with a particle diameter of 200 to 600 μm, and the powder was sintered to obtain a sintered body. The sintering was performed under the conditions of a temperature of 930 K, a pressure of 400 MPa, and a pressure holding time of 5 minutes.

The sintered body was subjected to hot hard working to obtain a rare earth magnet precursor. The hot hard working was performed under the conditions of a temperature of 1,050 K, a rolling reduction of 75%, and a strain rate of 0.1/s. The rare earth magnet precursor had a magnetization easy axis in the hot hard working direction (compression direction).

A modifier (low-melting-point alloy) was put into contact with the rare earth magnet precursor in the magnetization hard axis direction and heat-treated for diffusion and infiltration at 970 K over 6 hours in an argon atmosphere. The composition of the modifier (low-melting-point alloy) was $Nd_{70}Cu_{30}$.
<<Evaluation of Sample>>
Permanent magnets of Example and Comparative Example prepared as the sample were evaluated in the following manner.
<Evaluation 1: Observation of Alloy Structure and Composition Analysis>
With respect to the permanent magnet of Example, the alloy structure was observed using a scanning transmission electron microscope (STEM), and component analysis (EPMA surface analysis) was performed.
<Evaluation 2: Measurement of Curie Temperature>
The permanent magnets of Example and Comparative Example were measured for the Curie temperature. The measurement method is as follows. With respect to the sample of each of Example and Comparative Example, a pulsed magnetic field of 10 T was applied in the magnetization easy axis direction, and using a vibration sample magnetometer (VSM), while raising the temperature of each sample from room temperature (298 K) to 600 K in a state of a magnetic field of 1 T being applied to each sample, the magnetization of the sample was measured to determine the Curie temperature.
<Evaluation 3: Self-Remagnetization>
Three of the permanent magnet of Example were prepared and designated as Samples 1 to 3, and each of Samples 1 to 3 was magnetized under the same conditions. Each of Samples 1 to 3 after magnetization was heated and cooled in a cycle of 315 K-application temperature-315 K, and the magnetization $B_1$ at 315 K before heating to the application temperature and the magnetization $B_2$ at 315 K after heating to the application temperature and then cooling were measured. The magnetization recovery rate was calculated according to the following formula. The application temperature was 315 K for Sample 1, 445 K for Sample 2, and 588 K for Sample 3.

Magnetization recovery rate=$B_2/B_1 \times 100$

Figure 4:
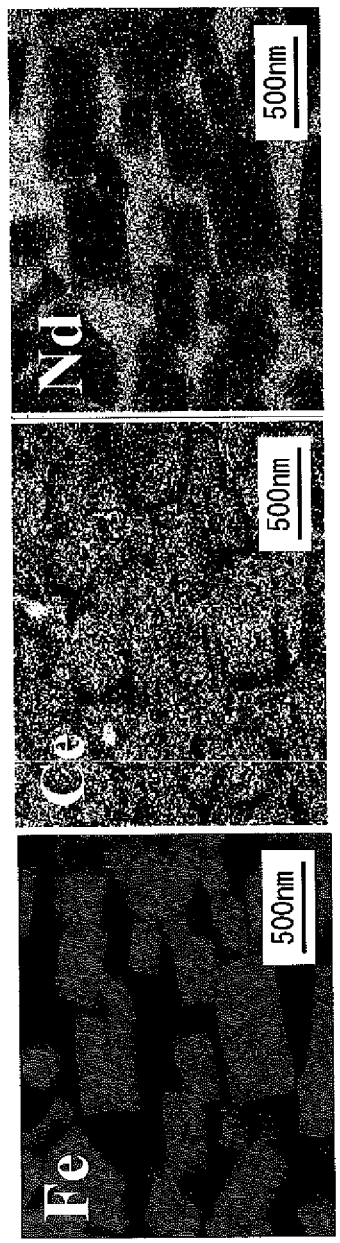
FIG. 4A illustrates the results of surface analysis on Fe.
FIG. 4B illustrates the results of surface analysis on Ce.
FIG. 4C illustrates the results of surface analysis on Nd.

<<Evaluation Results>>
The results of Evaluation 1 to Evaluation 3 are as follows.
<Results of Evaluation 1>
FIGS. 4A to 4C are diagrams illustrating the results of observing the alloy structure by means of a scanning transmission electron microscope (STEM) and performing EPMA surface analysis with respect to the permanent magnet of Example. FIG. 4A illustrates the results of surface analysis on Fe, FIG. 4B illustrates the results of surface analysis on Ce, and FIG. 4C illustrates the results of surface analysis on Nd. In FIGS. 4A to 4C, the bright field regions respectively indicate a region where Fe is present, a region where Ce is present, and a region where Nd is present.

With respect to the surface analysis results illustrated in FIGS. 4A to 4C, the followings can be said in terms of correspondence in FIG. 2 between the magnetic phase 30 and the grain boundary 40 as well as between the core part 32 and the shell part 34.

In an R—Fe—B-based rare earth magnet (R is a rare earth element), it is known that since the magnetic phase is $R_2Fe_{14}B$ and the grain boundary phase is an R-rich phase, many of Fe in the R—Fe—B-based rare earth magnet is present in the magnetic phase. In addition, the existing position of Fe dose not change before and after diffusion and infiltration of the modifier. This indicates that in FIG. 4A, the bright field region is the magnetic phase 30.

The rare earth magnet precursor does not contain Nd and even after heat treatment for diffusion and infiltration of the modifier, Nd does not diffuse and infiltrate into the core part 32. This indicates that in FIG. 4B, the dark field region is the core part 32.

In addition, the bright field region (magnetic phase 30) of FIG. 4A is larger than the dark field region (core part 32) of FIG. 4C. This suggests that Nd in the modifier diffused and infiltrated into the magnetic phase 30 to form a shell part 34.

In FIG. 4B, distinction between bright field and dark field is not clear. This suggests that in the rare earth magnet precursor, Ce is present in both the magnetic phase 30 and the grain boundary phase 40 and part of Ce in the shell part 34 is replaced by Nd due to heat treatment for diffusion and infiltration of the modifier.

Summarizing above, it is considered from FIGS. 4A to 4C that the core part 32 is a phase having a composition of $Ce_2Fe_{14}B$ and the shell part 34 is a phase having a composition of $(Ce, Nd)_2Fe_{14}B$.

<Results of Evaluation 2>

Figure 5:
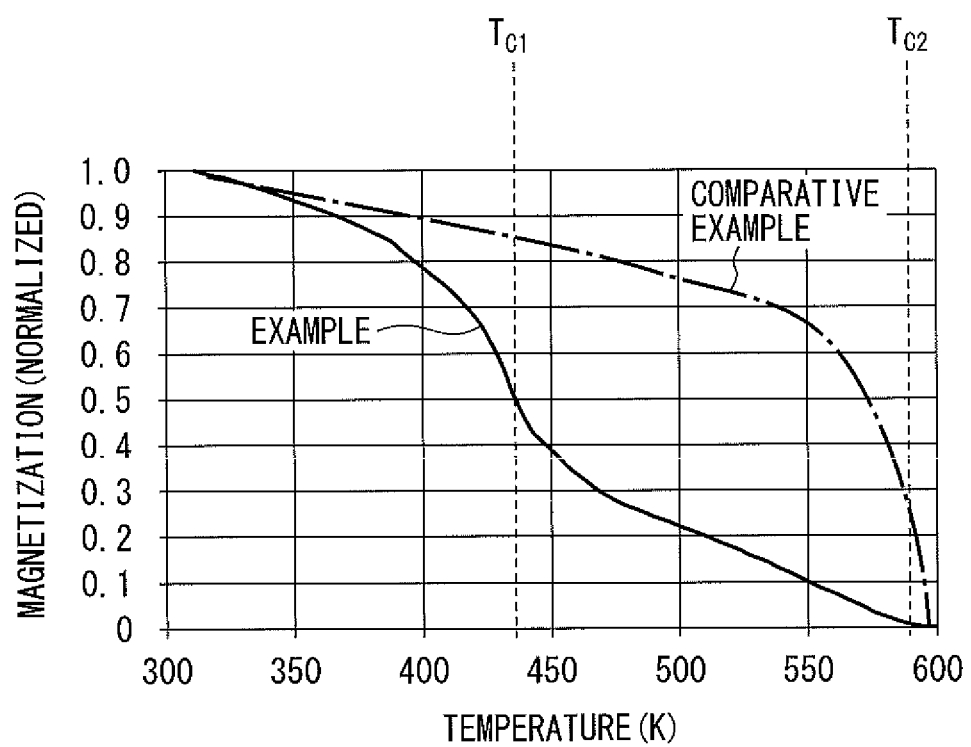
FIG. 5 is a graph illustrating the results of measuring the Curie temperature with respect to the permanent magnets of Example and Comparative Example.

FIG. 5 is a graph illustrating the results of measuring the Curie temperature with respect to the permanent magnets of Example and Comparative Example. In FIG. 5, the magnetization is normalized by taking the magnetization at 315 K as "1.0".

As seen from FIG. 5, the permanent magnet of Example has two different Curie temperatures of $T_{c1}$ K (430 K) and $T_{c2}$ K (595 K). $T_{c1}$ K is considered to be the Curie temperature of a phase having a composition of $Ce_2Fe_{14}B$ of the core part 32, and $T_{c2}$ K is considered to be the Curie temperature of a phase having a composition of $(Ce, Nd)_2Fe_{14}B$ of the shell part 34. From the results of alloy structure and composition analysis of Evaluation 1 and the results of measurement of Curie temperature of Evaluation 2, it could be confirmed that the permanent magnet of Example 1 is a composite permanent magnet having Curie temperatures of $T_{c1}$ K and $T_{c2}$ K.

<Results of Evaluation 3>

Figure 6:
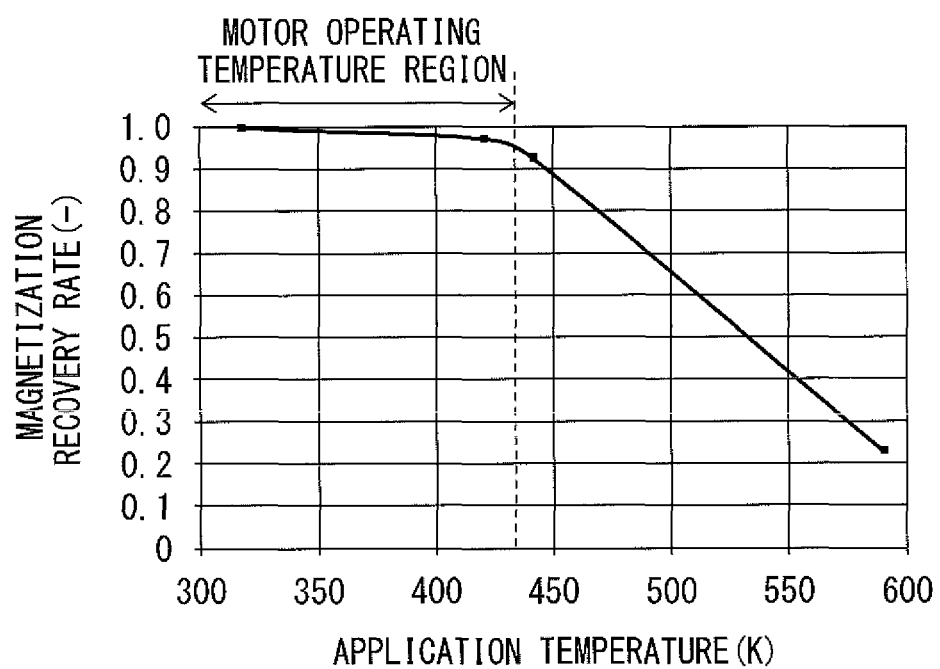
FIG. 6 is a graph illustrating the relationship between the application temperature and the magnetization recovery rate with respect to the composite permanent magnet of Example.

FIG. 6 is a graph illustrating the relationship between the application temperature and the magnetization recovery rate with respect to the permanent magnet of Example. In FIG. 6, $T_{c1}$ K (430 K) is denoted by a dashed line. The solid line is formed by smoothly connecting respective calculated values of the magnetization recovery rate. From the results of evaluation 2, $T_{c2}$ K is 595 K.

FIG. 6 shows that when the application temperature is not lower than $(T_{c1}-100)$ K and less than $T_{c2}$ K, the magnetization recovery rate exceeds 0. It can be understood from this that according to the method of the present disclosure, a composite permanent magnet applied to the rotor of a motor undergoes self-demagnetization and self-remagnetization.

From the results of evaluations 1 to 3, it an be understood that according to the method of the present disclosure, entrainment loss at the time of high rotation can be reduced without generating a magnetic flux in the reverse direction to the magnetic flux of a permanent magnet disposed on a rotor.

From these results, the effects of the motor control method of the present disclosure can be confirmed.

DESCRIPTION OF NUMERICAL REFERENCES

10 Rotor
12 Hole
20 Stator
30 Magnetic phase
32 Core part
34 Shell part
40 Grain boundary phase
50 Composite permanent magnet
55 Normal permanent magnet
60 Motor
62 Engine
64 Power dividing mechanism
66 Connecting shaft
68a, 68b Lubricating fluid passage

The invention claimed is:

1. A method for controlling a motor comprising a rotor having disposed thereon a composite permanent magnet having a magnetic phase and a grain boundary phase present around the magnetic phase, the magnetic phase having a core part and a shell part present around the core part, the Curie temperature of one of the core part and the shell part is $T_{c1}$ K, the Curie temperature of another is $T_{c2}$ K, and $T_{c2}$ K is higher than $T_{c1}$ K, the method comprising:
   utilizing a magnet torque and a reluctance torque to control a temperature of the composite permanent magnet by:
   (i) controlling the temperature of the composite permanent magnet to be $T_s$ K that is $(T_{c1}-100)$ K or higher and lower than $T_{c2}$ K when a magnitude of the reluctance torque is equal to or greater than a magnitude of the magnet torque in order to demagnetize the composite permanent magnet; and
   (ii) controlling the temperature of the composite permanent magnet to be lower than the temperature $T_s$ K or $T_{c1}$ K, whichever is lower, when the magnitude of the reluctance torque is less than the magnitude of the magnet torque in order to remagnetize the composite permanent magnet.

2. The method according to claim 1, wherein the Curie temperature of the core part is $T_{c1}$ K and the Curie temperature of the shell part is $T_{c2}$ K.

3. The method according to claim 2, wherein the composite permanent magnet has an overall composition of $(R^2_{(1-x)}R^1_x)_yFe_{(100-y-w-z-v)}Co_wB_zM_v$ (wherein $R^2$ represents one or more selected from the group consisting of Nd and Pr, $R^1$ represents one or more selected from group consisting of Ce, La, Gd, Y and Sc, M represents one or more selected from the group consisting of Ga, Al, Cu, Au, Ag, Zn, In and Mn and an unavoidable impurity, 0<x<1, y= from 12 to 20, z= from 5.6 to 6.5, w=from 0 to 8, and v= from 0 to 2), and $R^1/(R^2+R^1)$ in the core part is larger than $R^1/(R^2+R^1)$ in the shell part.

4. The method according to claim 3, wherein the average particle diameter of the magnetic phase is 1,000 nm or less.

5. The method according to claim 3, wherein $R^1$ is one or more selected from the group consisting of Ce and La and $R^2$ is Nd.

6. The method according to claim 3, wherein $R^1$ is Ce and $R^2$ is Nd.

7. The method according to claim 1, wherein the Curie temperature of the core part is $T_{c2}$ K and the Curie temperature of the shell part is $T_{c1}$ K.

8. The method according to claim 7, wherein the composite permanent magnet has an overall composition of $(R^2_{(1-x)}R^1_x)_y Fe_{(100-y-w-z-v)}Co_w B_z M_v$ (wherein $R^2$ represents one or more selected from the group consisting of Nd and Pr, $R^1$ represents one or more selected from group consisting of Ce, La, Gd, Y and Sc, M represents one or more selected from the group consisting of Ga, Al, Cu, Au, Ag, Zn, In and Mn and an unavoidable impurity, $0<x<1$, y= from 12 to 20, z= from 5.6 to 6.5, w= from 0 to 8, and v= from 0 to 2), and $R^1/(R^2+R^1)$ in the core part is larger than $R^1/(R^2+R^1)$ in the shell part.

9. The method according to claim 8, wherein the average particle diameter of the magnetic phase is 1,000 nm or less.

10. The method according to claim 8, wherein $R^1$ is one or more selected from the group consisting of Ce and La and $R^2$ is Nd.

11. The method according to claim 8, wherein $R^1$ is Ce and $R^2$ is Nd.

12. The method according to claim 1, wherein when the magnitude of the reluctance torque is equal to or greater than the magnitude of the magnet torque, a heat insulating material is disposed on the motor so as to set the temperature of the composite permanent magnet at $T_s$ K that is $(T_{c1}-100)$ K or higher and lower than $T_{c2}$ K, and
when the magnitude of the reluctance torque is less than the magnitude of the magnetic torque, the heat insulating material is removed from the motor so as to set the temperature of the composite permanent magnet at lower than the temperature $T_s$ K or $T_{c1}$ K, whichever is lower.

13. The method according to claim 1, wherein when the magnitude of the reluctance torque is equal to or greater than the magnitude of the magnet torque, a heat radiation member on the motor is removed so as to set the temperature of the composite permanent magnet at $T_s$ K that is $(T_{c1}-100)$ K or higher and lower than $T_{c2}$ K, and
when the magnitude of the reluctance torque is less than the magnitude of the magnetic torque, the heat radiation member is again disposed on the motor so as to set the temperature of the composite permanent magnet at lower than the temperature $T_s$ K or $T_{c1}$K, whichever is lower.

14. The method according to claim 1, wherein the motor is disposed in an electric-powered vehicle,
when the magnitude of the reluctance torque is equal to or greater than the magnitude of the magnet torque, the flow rate of a cooling fluid supplied to the motor is decreased so as to set the temperature of the composite permanent magnet at $T_s$ K that is $(T_{c1}-100)$ K or higher and lower than $T_{c2}$ K, and
when the magnitude of the reluctance torque is less than the magnitude of the magnetic torque, the flow rate of the cooling fluid is increased so as to set the temperature of the composite permanent magnet at lower than the temperature $T_s$ K or $T_{c1}$ K, whichever is lower.

15. The method according to claim 14, wherein the electric-powered vehicle is a hybrid vehicle having an engine and the motor, and
the cooling fluid is a lubricating fluid filled inside a power dividing mechanism connecting the engine and the motor.

16. The method according to claim 1, wherein when the magnitude of the reluctance torque is equal to or greater than the magnitude of the magnet torque, the temperature of the composite permanent magnet is set at $T_s$ K that is $(T_{c1}-50)$ K or higher and lower than $T_{c2}$ K.

17. The method according to claim 1, wherein when the magnitude of the reluctance torque is equal to or greater than the magnitude of the magnet torque, the temperature of the composite permanent magnet is set at $T_s$ K that is $T_{c1}$ K or higher and lower than $T_{c2}$ K.

18. The method according to claim 1, wherein when the magnitude of the reluctance torque is equal to or greater than the magnitude of the magnet torque, the temperature of the composite permanent magnet is set at $T_s$ K that is $(T_{c1}-100)$ K or higher and $(T_{c2}-5)$ K or lower.

19. The method according to claim 1, wherein when the magnitude of the reluctance torque is equal to or greater than the magnitude of the magnet torque, the temperature of the composite permanent magnet is set at $T_s$ K that is $(T_{c1}-50)$ K or higher and $(T_{c2}-5)$ K or lower.

20. The method according to claim 1, wherein when the magnitude of the reluctance torque is equal to or greater than the magnitude of the magnet torque, the temperature of the composite permanent magnet is set at $T_s$ K that is $T_{c1}$ K or higher and $(T_{c2}-5)$ K or lower.

21. The method according to claim 1, wherein when the magnitude of the reluctance torque is equal to or greater than the magnitude of the magnet torque, the temperature of the composite permanent magnet is set at $T_s$ K that is $(T_{c1}-100)$ K or higher and $(T_{c1}+50)$ K or lower.

22. The method according to claim 1, wherein when the magnitude of the reluctance torque is equal to or greater than the magnitude of the magnet torque, the temperature of the composite permanent magnet is set at $T_s$ K that is $(T_{c1}-50)$ K or higher and $(T_{c1}+50)$ K or lower.

23. The method according to claim 1, wherein when the magnitude of the reluctance torque is equal to or greater than the magnitude of the magnet torque, the temperature of the composite permanent magnet is set at $T_s$ K that is $T_{c1}$ K or higher and $(T_{c1}+50)$ K or lower.

24. The method according to claim 1, wherein the temperature of the composite permanent magnet is detected by a temperature sensor disposed inside or outside the motor.

* * * * *